(12) United States Patent
Bin et al.

(10) Patent No.: US 10,560,750 B2
(45) Date of Patent: Feb. 11, 2020

(54) INFORMATION DISPLAY METHOD, APPARATUS AND SMART TELEVISION

(71) Applicant: Alibaba Group Holding Limited, Grand Cayman (KY)

(72) Inventors: Lin Bin, Hangzhou (CN); Chao Huang, Hangzhou (CN); Haijun Jia, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 141 days.

(21) Appl. No.: 14/798,186

(22) Filed: Jul. 13, 2015

(65) Prior Publication Data
US 2016/0021427 A1    Jan. 21, 2016

(30) Foreign Application Priority Data

Jul. 15, 2014 (CN) .......................... 2014 1 0337254

(51) Int. Cl.
*H04N 21/472* (2011.01)
*H04N 21/485* (2011.01)

(52) U.S. Cl.
CPC ....... *H04N 21/472* (2013.01); *H04N 21/4858* (2013.01)

(58) Field of Classification Search
CPC ............. H04N 21/472; H04N 21/4858; H04N 21/4316; H04N 21/4725; H04N 21/858
See application file for complete search history.

(56) References Cited

U.S. PATENT DOCUMENTS

| | | | | |
|---|---|---|---|---|
| 7,607,150 B1 * | 10/2009 | Kobayashi | ............ | G06F 3/0482 348/206 |
| 2005/0114778 A1 * | 5/2005 | Branson | ................ | G06F 9/4446 715/711 |
| 2007/0268300 A1 | 11/2007 | Janet et al. | | |
| 2008/0066017 A1 | 3/2008 | Hall et al. | | |
| 2010/0157157 A1 * | 6/2010 | Yi | ...................... | H04N 5/44591 348/570 |
| 2010/0235791 A1 | 9/2010 | Chee et al. | | |
| 2012/0054022 A1 | 3/2012 | Kosashvili | | |
| 2012/0260218 A1 * | 10/2012 | Bawel | ................. | G06F 3/04815 715/841 |
| 2012/0284245 A1 | 11/2012 | Portnoy et al. | | |
| 2013/0185642 A1 * | 7/2013 | Gammons | ............. | G06F 3/0482 715/733 |
| 2014/0049691 A1 * | 2/2014 | Burdzinski | .............. | H04N 5/44 348/563 |

(Continued)

OTHER PUBLICATIONS

PCT Search Report and Written Opinion dated Oct. 6, 2015 for PCT Application No. PCT/US15/40183, 8 pages.

*Primary Examiner* — Benjamin R Bruckart
*Assistant Examiner* — Susan X Li
(74) *Attorney, Agent, or Firm* — James J. DeCarlo; Greenberg Traurig, LLP

(57) ABSTRACT

An information display method is disclosed to solve a problem of tediousness and inefficiency of a process of displaying an information set corresponding to an information portal in existing technologies. The method includes: acquiring a selection instruction for an information portal; acquiring an information set corresponding to the information portal; and displaying the information set. The present disclosure further discloses an information display apparatus and a smart television.

14 Claims, 12 Drawing Sheets

(56) References Cited

U.S. PATENT DOCUMENTS

2014/0059637 A1* 2/2014 Chen ................. G06F 3/017
　　　　　　　　　　　　　　　　　　725/134
2014/0325339 A1* 10/2014 Gao ................ G06F 17/2247
　　　　　　　　　　　　　　　　　　715/234

* cited by examiner

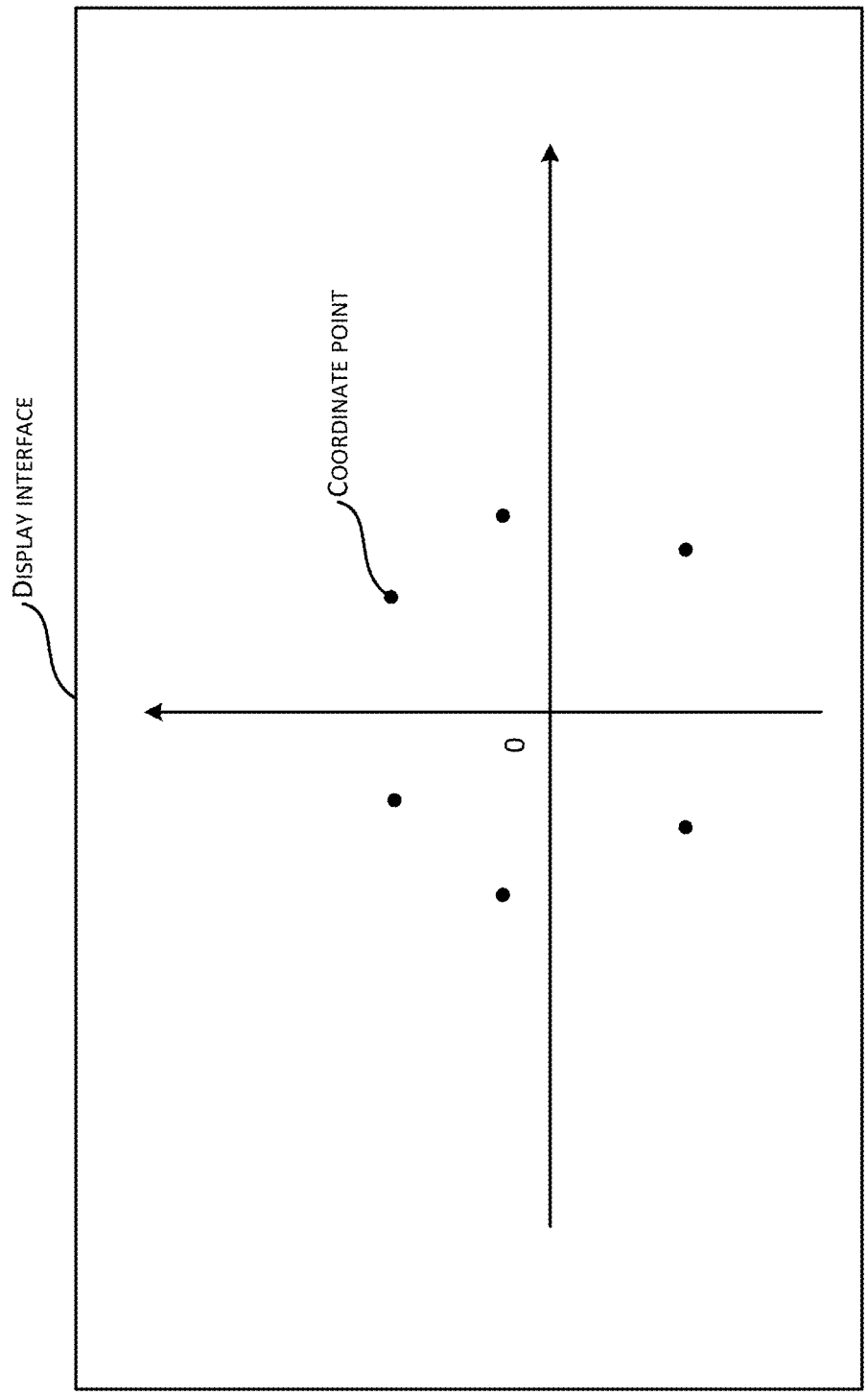

INFORMATION DISPLAY METHOD, APPARATUS AND SMART TELEVISION

CROSS REFERENCE TO RELATED PATENT APPLICATION

This application claims foreign priority to Chinese Patent Application No. 201410337254.2 filed on Jul. 15, 2014, entitled "Information Display Method, Apparatus and Smart Television", which is hereby incorporated by reference in its entirety.

TECHNICAL FIELD

The present disclosure relates to the field of computer technologies, and in particular, to information display methods, apparatuses and smart televisions.

BACKGROUND

Recently, a common method used by a device to display information includes providing an information portal operable by a user; and executing, by the user, designated operations on the information portal to trigger the device to display an information set corresponding to the information portal. The information set includes at least one piece of information, and the designated operations described herein refer to the user selecting an information portal using an instruction input apparatus (for example, a mouse, a keyboard, or a remote controller) and controlling the instruction input apparatus to send a "confirm" instruction.

Generally, a text, an image, a video, etc., can be used as an information portal. In other words, an information portal may display a text, an image, a video, etc. For a situation where an image is used as an information portal, the image may be a poster (the poster refers to an electronic image used to introduce information related to a drama, a movie, a sports event, an artistic performance, a seminar, for example, and the poster used as the information portal may be referred to as a major poster) as shown in FIG. 1, or may be an icon as shown in FIG. 2, etc. In an event that a poster is used as an information portal, for example, a user may control a cursor to move to a certain major poster displayed by a device to implement a selection on the information portal through an operation of a mouse. The user may then send a "confirm" instruction to the device to trigger the device to display an information set corresponding to the selected major poster by clicking a left button of the mouse. The information set may include, but is not limited to, at least one poster other than the selected major poster.

The above information display method has a defect that a process thereof is relatively tedious and inefficient due to the need of performing a selection of an information portal and sending of a "confirm" instruction in order to be able to trigger a device to display an information set corresponding to the information portal.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide an information display method to solve the problem of tediousness and inefficiency of a process of displaying an information set corresponding to an information portal in existing technologies.

The embodiments of the present disclosure further provide an information display apparatus to solve the problem of tediousness and inefficiency of a process of displaying an information set corresponding to an information portal in existing technologies.

The embodiments of the present disclosure further provide a smart television to solve the problem of tediousness and inefficiency of a process of displaying an information set corresponding to an information portal in existing technologies.

The embodiments of the present disclosure use technical solutions as follows.

An information display method includes: acquiring a selection instruction for an information portal; acquiring an information set corresponding to the information portal; and displaying the information set.

An information display apparatus includes: an instruction acquisition unit to acquire a selection instruction for an information portal; a set acquisition unit to acquire an information set corresponding to the information portal for which the selection instruction is acquired by the instruction acquisition unit; and an information set display unit to display the information set acquired by the set acquisition unit.

The embodiments of the present disclosure may employ at least one of the above technical solutions to achieve the following beneficial effects:

Since an information set corresponding to an information portal may be acquired and displayed based on a selection instruction for the information portal, a "confirm" instruction inputted via a control of an instruction input apparatus is not needed as a display triggering condition for the information set, thus reducing the complexity of a process of displaying the information set and improving the efficiency of the process.

BRIEF DESCRIPTION OF THE DRAWINGS

Accompanying drawings described herein are provided for further understanding of the present disclosure, and constitute a part of the present disclosure. Exemplary embodiments of the present disclosure and a description thereof are used to illustrate the present disclosure, but do not impose any improper limitation on the present disclosure. In the accompanying drawings:

FIG. 4B is a schematic diagram of a coordinate point represented by a coordinate value of a display position that is configured for each piece of information in an information set.

DETAILED DESCRIPTION

In order to make objectives, technical solutions, and advantages of the present disclosure more comprehensible, the technical solutions of the present disclosure will be clearly and completely described herein with reference to exemplary embodiments of the present disclosure and accompanying drawings corresponding thereto. Apparently, the described embodiments merely represent some and not all of the embodiments of the present disclosure. All other embodiments acquired by one of ordinary skill in the art based on the embodiments of the present disclosure without making any creative efforts shall belong to the protective scope of the present disclosure.

The technical solutions provided in the embodiments of the present disclosure are described herein in detail in combination with the accompanying drawings.

First Embodiment

Figure 1:
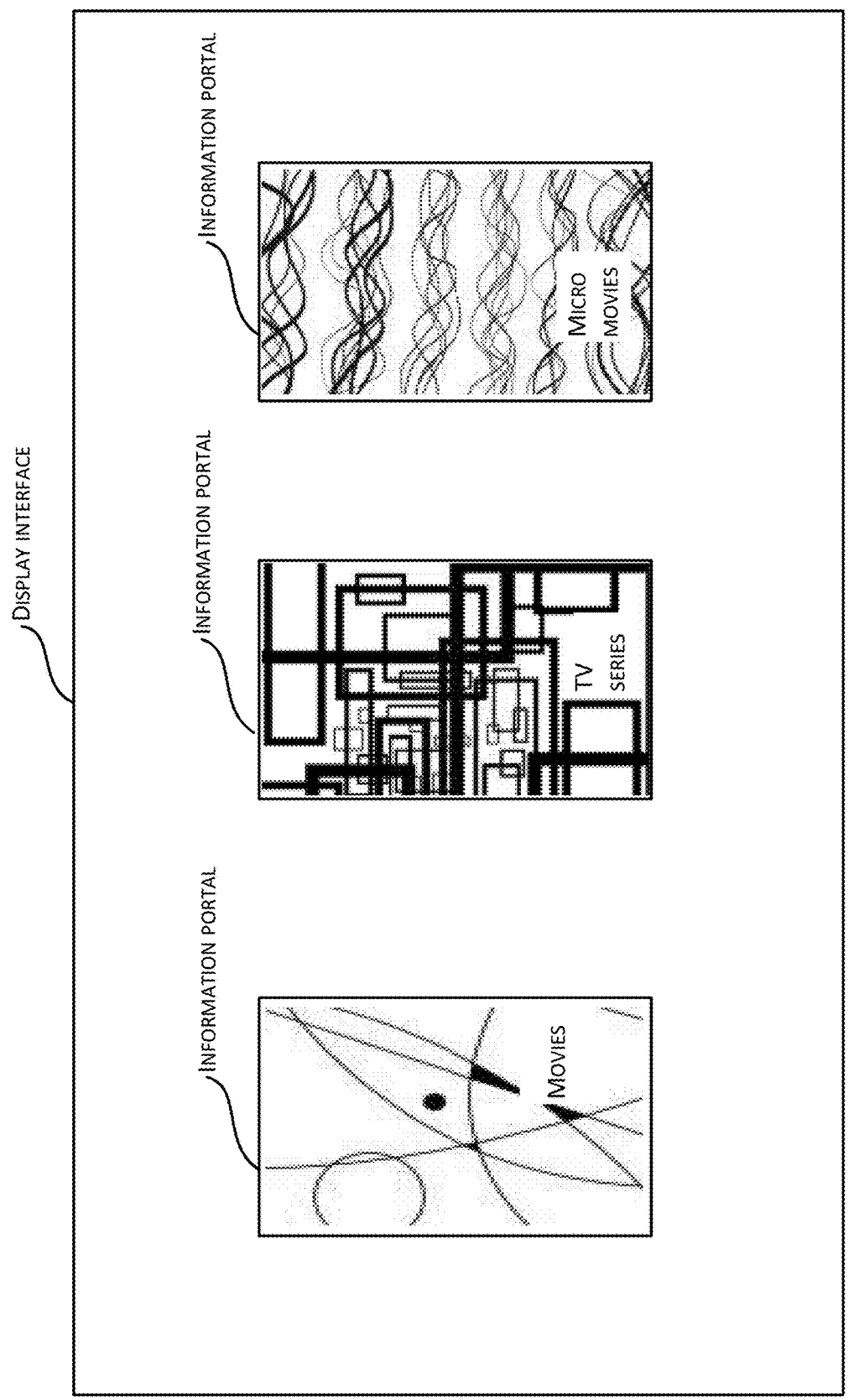
FIG. 1 is a schematic diagram of using an image as an information portal in existing technologies.
Figure 2:
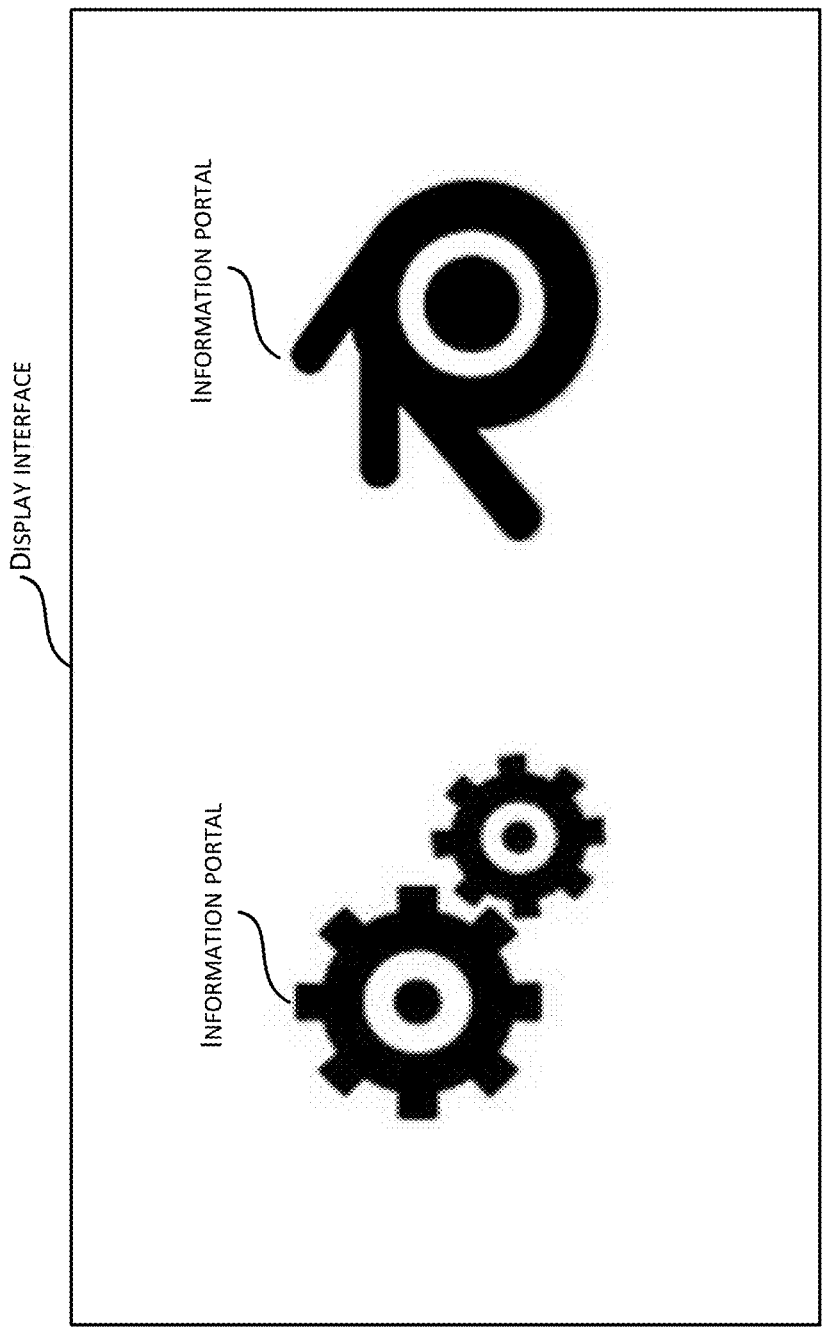
FIG. 2 is a schematic diagram of using an icon as an information portal in existing technologies.
Figure 3:
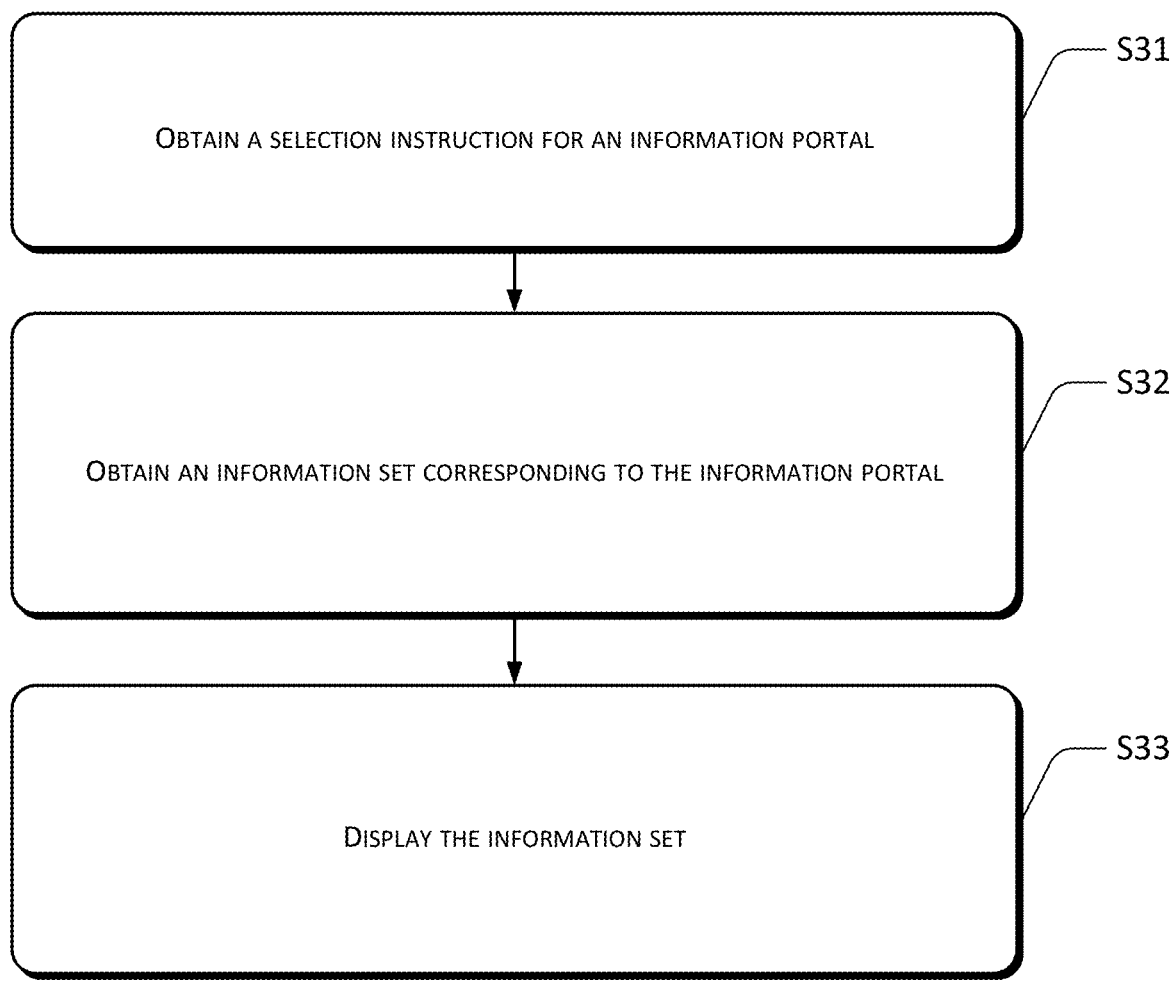
FIG. 3 is a flowchart illustrating an information display method in accordance with a first embodiment of the present disclosure.

The first embodiment provides an information display method to solve the problem of tediousness and inefficiency of a process of displaying an information set corresponding to an information portal in existing technologies. As shown in FIG. 3, the method may include the following blocks:

Block S31 obtains a selection instruction for an information portal.

For example, in an event that a smart television uses and displays a major poster used as an information portal, a user may control a focus and move the focus to the major poster using a remote controller. In response to detecting that the focus is moved to the major poster, the smart television may determine that a selection instruction for the information portal is obtained.

Optionally, the smart television may determine that a selection instruction for the information portal is obtained in response to determining that a time period of a stay of the focus on the major poster is greater than a stay time threshold.

Block S32 obtains an information set corresponding to the information portal.

Information in the information set may include, but is not limited to, a text, an image, a video, etc.

In an embodiment of the present disclosure, a correspondence relationship between the information portal and the information set may be set up in advance. For example, when information used as the information portal is "a poster of the hottest TV series", an information set having a correspondence relationship with the information portal may be set to be an information set satisfying "information included being 'a poster of the TV series'. For another example, when information used as the information portal is "a text introduction of the hottest movie", an information set having a correspondence relationship with the information portal may be set to be an information set satisfying "information included being 'a text introduction of the movie'", and so on.

The information set corresponding to the information portal may be stored in a server or may be stored locally.

When the information set corresponding to the information portal is stored in a server, the information set may be acquired by sending an information acquisition request to the server. In order to facilitate the server to find the information set, the information acquisition request may include an identification of the information portal. The server may find the information set mapped to the information portal based on the identification of the information portal and a mapping relationship between identifications of different information portals and respective information sets. The identification of the information portal may include, but is not limited to, a portal identification assigned to the information portal in advance or a type identification of the information used as the information portal, etc.

Optionally, the server may determine information matched with the identification of the information portal based on the identification of the information portal, and then select a particular number of pieces of information from the matched information sequentially according to a descending order of popularity or heat rate of information to form an information set corresponding to the information portal.

Block S33 displays the information set acquired at block S32.

Two main implementations of block S33 are highlighted in a later section, and therefore are not repeatedly described at this point.

It should be noted that, in order to restore a display interface to a state before an information portal is selected when the information portal receives no selection, the method may further include: restoring an interface corresponding to the information portal to a state before the information portal is selected in response to detecting that the information portal is switched from receiving a selection to receiving no selection, after block S33 is performed. Alternatively, this method block may include: restoring an interface corresponding to the information portal to a state before the information portal is selected in response to detecting that no information portal is selected.

In an embodiment of the present disclosure, in order to allow a user to acquire user personal information conveniently, an information portal of the user personal information may also be displayed when the information set is displayed. The user personal information may include, but is not limited to: browsing history information of the user for a piece of information (for example, record information associated with viewing a video by the user), information recommended based on user past operations on the information or information collected by the user, etc. The user may trigger the display of the user personal information by selecting the information portal of the user personal information.

Moreover, in order to enable the user to conveniently acquire recently popular information, the hot-spot information that is matched with the information portal at block S31 may further be displayed when the information set is displayed. A "poster of the hottest TV series" is used as an example of the information of the information portal. Hot-spot information matched with the information portal may be information related to the "poster of the hottest TV series", for example, titles of some popular TV series such as "Small Father", or a name of a TV series having the maximum number of views, such as "The Big Bang". Alternatively, when the information set is displayed, other information that is matched with the information portal at block S31 may also be displayed at the same time. For example, text description information of the information portal, etc., may be displayed.

In order to enable the user to start a game conveniently when viewing the displayed information set, an access portal of the game may also be displayed at the same time when the information set is displayed. The user may trigger to start the game by selecting the access portal of the game.

Similarly, in order to enable the user to access a website conveniently when viewing the displayed information set, an access portal of the website may also be displayed when the information set is displayed. The user may trigger an access to the website by selecting the access portal of the website.

In an embodiment of the present disclosure, when displaying the information set, the hot-spot information matched with the information portal, the information portal of the user personal information, the access portal of the game, and the access portal of the website may be displayed together, or one or more of these types of content may be displayed.

In addition to the above access portal(s), other application portal(s) may also be displayed.

Optionally, if the information portal displays information of a first-level category prior to receiving the selection, the information set corresponding to the information portal may include: information of a second-level category under the first-level category. In this case, a specific implementation of block S33 may include: displaying the information set on an interface corresponding to the information portal. The interface corresponding to the information portal may include: an interface used to display the information portal.

Optionally, the information of the second-level category may include, but is not limited to, update information of the second-level category or/and hot-spot information of the second-level category.

Optionally, after the information set is displayed on the interface corresponding to the information portal, the disclosed method may further include: receiving a selection instruction for the information in the displayed information set; and jumping to a page corresponding to the selected information.

By using the method provided in the first embodiment, since an information set corresponding to an information portal may be acquired and displayed based on a selection instruction for the information portal, an input of a "confirm" instruction as a display triggering condition of the information set through controlling an instruction input apparatus is not needed, thus reducing the complexity of a process of displaying the information set and improving the efficiency of the process.

It should be noted that an entity executing the method blocks provided in the first embodiment may be a same device. Alternatively, the method may be performed by a plurality of different devices as executing entities. For example, an entity that performs blocks S31 and S32 may be a first device, and an entity that performs block S33 may be a second device. For another example, a first device may perform block S31, and a second device may perform blocks S32 and S33, etc.

Furthermore, an implementation of block S33 is described hereinafter.

In an embodiment of the present disclosure, two main implementations of block S33 may exist. A first approach is referred to as a popcorn display mode; and a second approach is referred to as an image wall display mode. The two approaches are respectively described hereinafter.

I. Popcorn Display Mode

A pre-condition for using the popcorn display mode is that the information set acquired at block S32 includes at least two pieces of information. Under such condition that this information set is acquired, the information set may be displayed based on a first particular parameter.

The first particular parameter includes at least a display position parameter. The display position parameter is used to indicate a position of displaying the information, and the display position parameter satisfies that: respective positions of displaying various pieces of information in the information set are distributed radially or quasi-radially with the center being located at a position of the information portal.

Figure 4A:
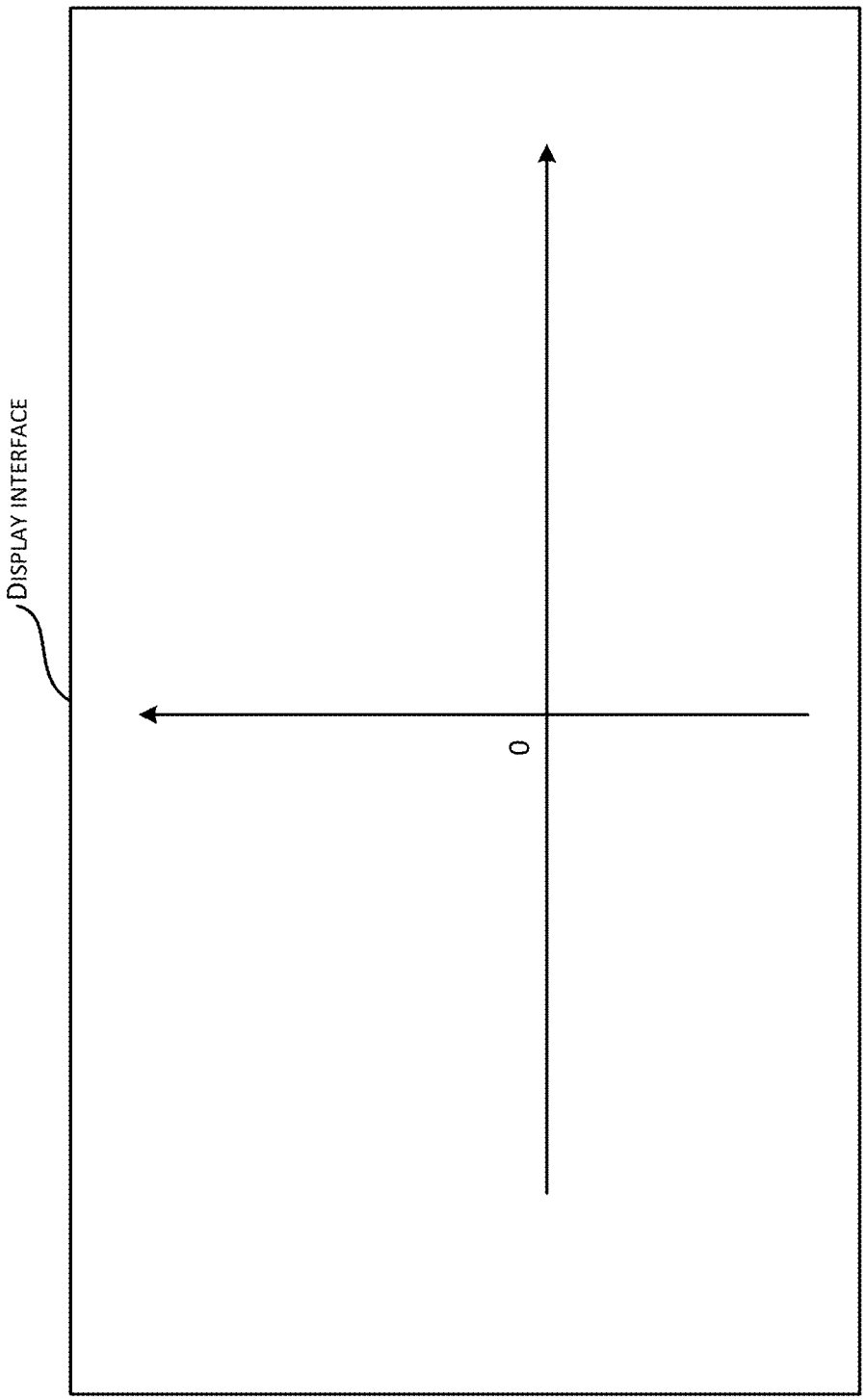
FIG. 4A is a schematic diagram of a coordination system established for a display interface of a smart television.

For example, a smart television is used as an example of a device for displaying an information set. A coordination system as shown in FIG. 4A is assumed to be established based on a display interface of the smart television. An origin of the coordinate system is located at a center position of a selected major poster. Based on the coordinate system as shown in FIG. 4A, a display position parameter as described above may be a coordinate value of a display position that is set for each piece of information in an information set. A schematic diagram of respective coordinate points represented by these coordinate values may be represented by FIG. 4A. As can be seen from FIG. 4B, these coordinate points are distributed radially with the center being the origin of the coordinate system.

Figure 4C:
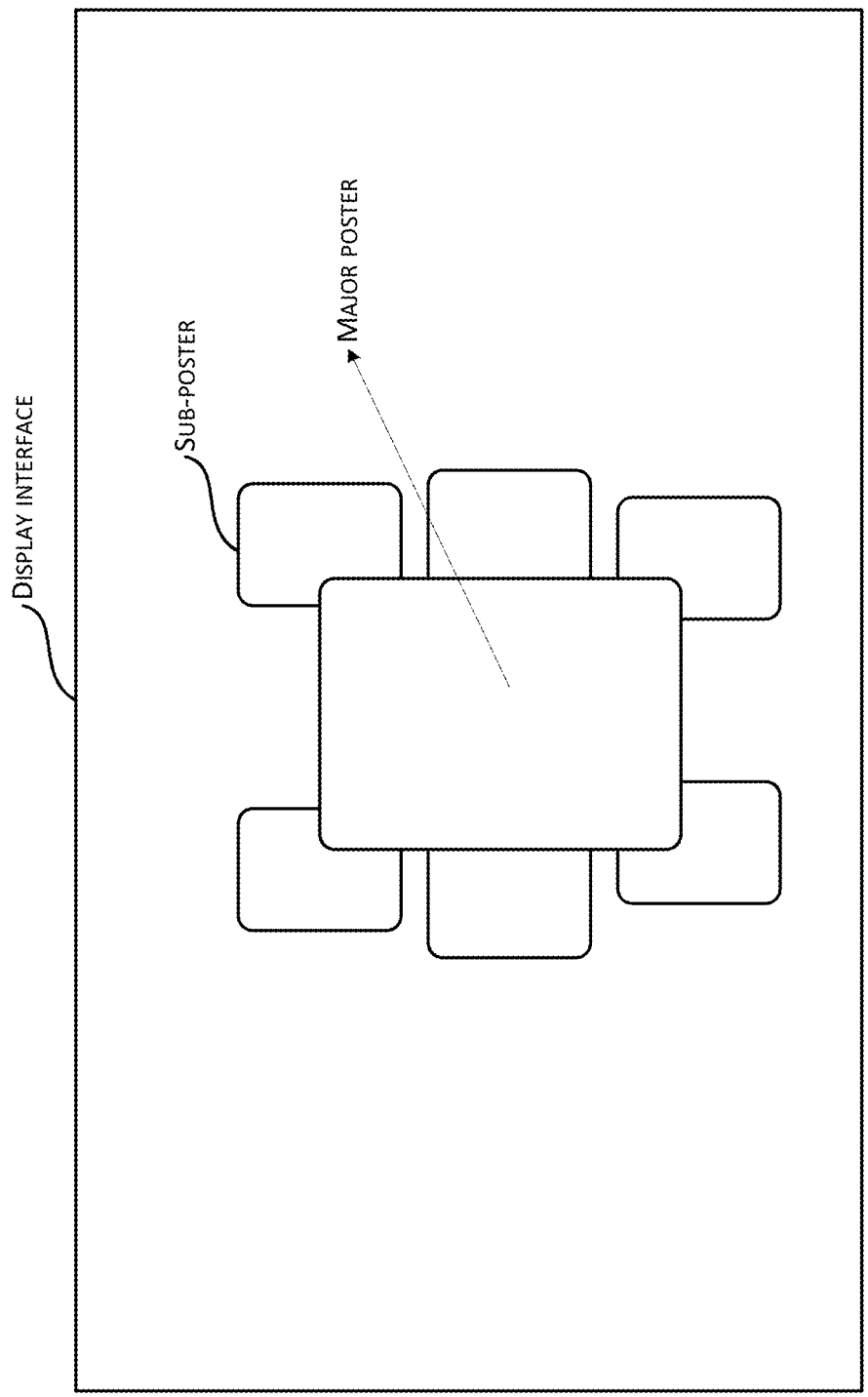
FIG. 4C is a schematic diagram of a sub-poster that is displayed in accordance with the coordinate value of the coordinate point shown in FIG. 4B.

If information in the information set is also a poster (which is referred to as a sub-poster in order to be distinguished from the major poster), a finally displayed sub-poster, such as the one shown in FIG. 4C, may be acquired according to the coordinate point shown in FIG. 4B.

It should be noted that the major poster may continue to be displayed or may no longer be displayed when the sub-poster is displayed according to the mode shown in FIG. 4C.

An advantage of the popcorn display mode includes facilitating a user to view an information set that is presented in a relatively elegant display mode while reducing the complexity of a process of displaying the information set and improving the efficiency of the process, thereby improving the user experience.

In an embodiment of the present disclosure, the foregoing popcorn display mode may further be improved to achieve a better display effect. A number of main improvements are described hereinafter.

A First Improvement:

The display position parameter is set to include a transient position parameter and a final position parameter such that the process of displaying information presents a "rebound" effect.

Specifically, when block S33 is executed, the information in the information set may first be displayed at a transient position according to the transient position parameter. The information in the information set that is displayed at the transient position may then be moved to a final position for display based on the final position parameter.

The transient display parameter and the final position parameter are both used to indicate display positions of the information. Furthermore, the transient display parameter and the final position parameter both satisfy a condition that display positions of various pieces of information in the information set are distributed radially or quasi-radially with the position of the information portal as the center thereof. Moreover, as compared to the display position of the information represented by the final position parameter, the display position of the information represented by the transient position parameter is closer to the center.

A Second Improvement:

In addition to the display position parameter, the first particular parameter may further includes at least one of: an animation time length parameter, a transparency parameter and a delayed display time length parameter.

The above parameters have the following effects:

The animation time length parameter is used to indicate a time length from a time of receiving a selection instruction for an information portal to a time of displaying an information set based on the final position parameter.

The transparency parameter is used to indicate a degree of transparency of the information set being displayed, or indicate a variation rule of the degree of transparency (such as from opaque to 50% transparency) of the information set being displayed.

The delayed display time length parameter is used to indicate a time length from the time of obtaining the selection instruction for the information portal to the time of displaying the information set.

In addition to the foregoing improvements, it should be further noted that the method provided in the first embodiment may further include a method block after executing block S33: performing a reverse operation of displaying the information set corresponding to the information portal based on the first particular parameter as described above in response to detecting that the information portal at block S31 is switched from receiving selection to receiving no selection. For example, if an operation of displaying an information set corresponding to an information portal based on a first particular parameter includes: moving pieces of information in the information set to respective positions distributed radially with the information portal as the center according to an approach of gradually moving away from a position of the information portal, a reverse operation of such operation may include: moving the pieces of information in the information set from the respective positions distributed radially with the information portal as the center to positions close to the information portal according to an approach of gradually moving closer to the position of the information portal. As can be seen, according to a technical solution provided in the present disclosure, after a user selects a certain information portal and views a displayed information set corresponding to the information portal, the user only needs to move a cursor to select another information portal if the information set does not have any information that the user is interested in, and thus view an information set associated with the other information portal in a quick manner. However, according to an existing control mode, the user has to control an instruction input apparatus to input a "Return" instruction in order to return to an information portal interface, moves the cursor to select another information portal, and then controls the instruction input apparatus to input a "confirm" instruction to trigger a display of an information set corresponding to the currently selected information portal.

Apparently, as compared with the existing technologies, the present disclosure provides a quick and convenient method of viewing information, which increases a control speed and reduces times of processing and responding the "return" and "confirm" instructions.

Moreover, it should be noted that, in an embodiment of the present disclosure, if information used as an information portal includes: a foreground layer element, a background image, title information and hot-spot information, the method provided in the first embodiment may further include displaying the information portal according to a second particular parameter in order for the information used as the information portal to render an animation effect prior to performing block S31.

The second particular parameter described herein may include, but is not limited to, an animation effect parameter of the foreground layer element, an animation effect parameter of the background image, an animation effect parameter of the title information, and an animation effect parameter of the hot-spot information.

Specifically, the animation effect parameter of the foreground layer element may include, but is not limited to, a time parameter of sliding into the background image, a displacement parameter, a transparency parameter or a zoom range parameter.

The animation effect parameter of the background image, the animation effect parameter of the title information and the animation effect parameter of the hot-spot information may each include: a displacement parameter, a transparency parameter or a zoom range parameter.

Meanings of the parameters are given as follows:

A time parameter of sliding into a background image is used to indicate a time when an image slides into the background image. This time (referred to as a first time) is generally relative to a time (referred to as a second time) when "an instruction to trigger a display of an information portal" is received. For example, the first time may be three seconds after the second time.

A displacement parameter is used to indicate a displacement of an image relative to a reference position during a display process.

A transparency parameter is used to indicate a degree of transparency of an image being displayed, or indicate a variation rule of the degree of transparency of the image being displayed.

II. Image Wall Display Mode

The image wall display mode is mainly used when respective information in both an information portal and an information set corresponding to an information portal is an image.

Figure 5:
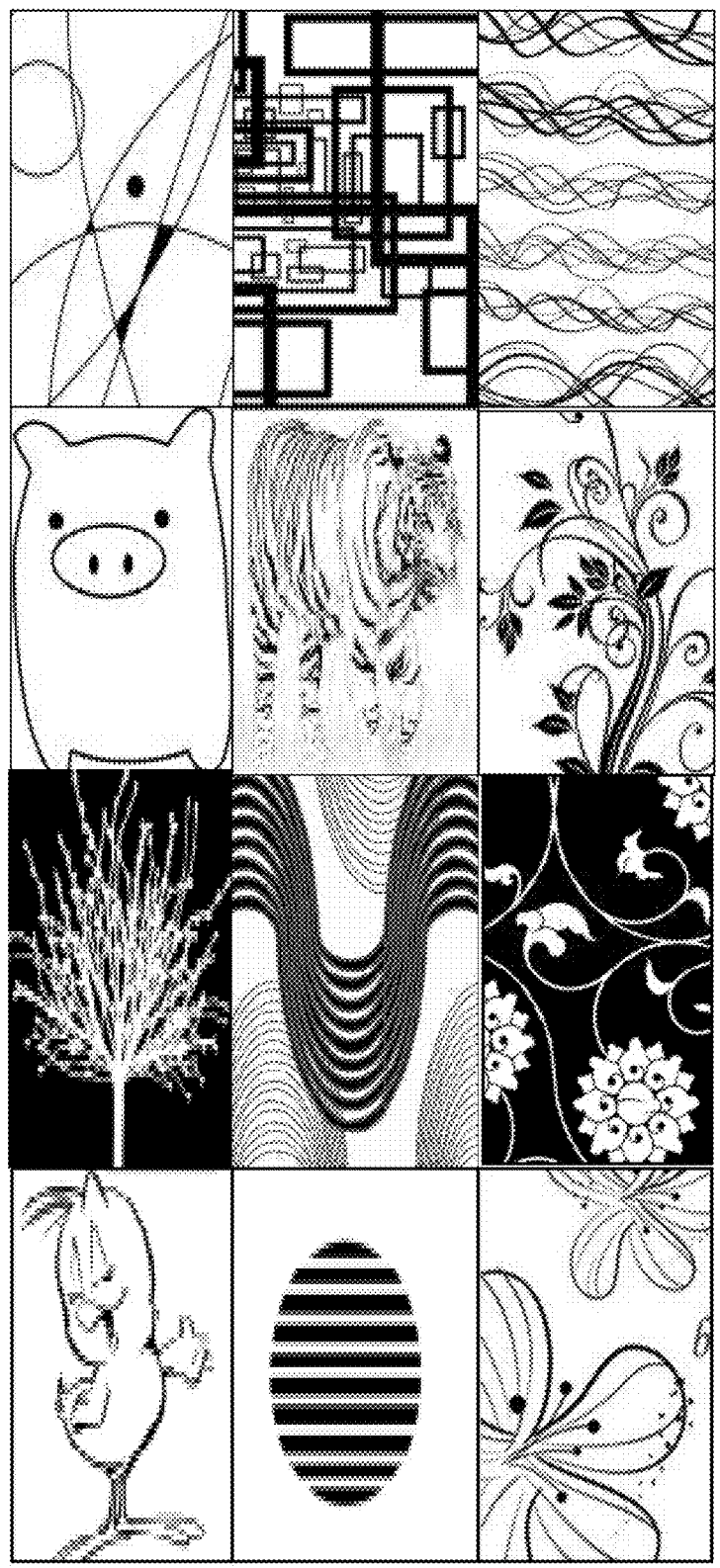
FIG. 5 is a schematic diagram of an example image wall in accordance with an embodiment of the present disclosure.

In this case, a specific implementation of block S33 as described above may include: reducing a current size of an image used as the information portal at block S31 according to a zoom scale parameter to acquire a reduced image; and displaying an image wall formed by the reduced image and image(s) included in the information set at the position of the information portal. A schematic diagram of an example image wall is shown in FIG. 5.

Optionally, in an embodiment of the present disclosure, an approach of displaying the image wall may include: displaying the image wall based on an image wall curvature parameter and/or an image position adjustment parameter.

Specifically, the image wall curvature parameter may include: a curvature value of the image wall relative to a particular plane. In an embodiment of the present disclosure, a bending of the image wall may be implemented according to a drawBitmapMesh method of a native Canvas element, which is not redundantly described herein.

The image position adjustment parameter may include a frame per second (FPS) and position information of various images forming the image wall in different frames. The FPS refers to the number of frames displayed per second.

In an embodiment of the present disclosure, when the image position adjustment parameter includes the FPS and the position information of various images forming the image wall in different frames, an approach of displaying the image wall according to the image position adjustment parameter may include: refreshing the display interface according to the FPS, and displaying the various images according to the position information of the various images in different frames in each refresh, thereby rendering an animation effect of dynamically changing the positions of the images in the image wall. The image position adjustment parameter may be set by the user independently.

When the image position adjustment parameter includes both the image wall curvature parameter and the image position adjustment parameter, and the image position adjustment parameter includes the FPS and the position information of various images forming the image wall in different frames, the display interface may be refreshed according to the FPS, and the image wall may be displayed according to the position information of various images in the different frames and the image wall curvature parameter in each refresh.

Optionally, in an event that the image wall display mode is used, if an original size of an image used as an information portal does not match with a display size of the information portal, the method provided by the first embodiment may further include, prior to block S31: adjusting the size of the image used as the information portal to acquire an adjusted image based on an adjustment rule that the size of the image used as the information portal is not less than a minimum size threshold and is not larger than the display size of the information portal; and displaying the adjusted image.

Second Embodiment

Figure 6A:
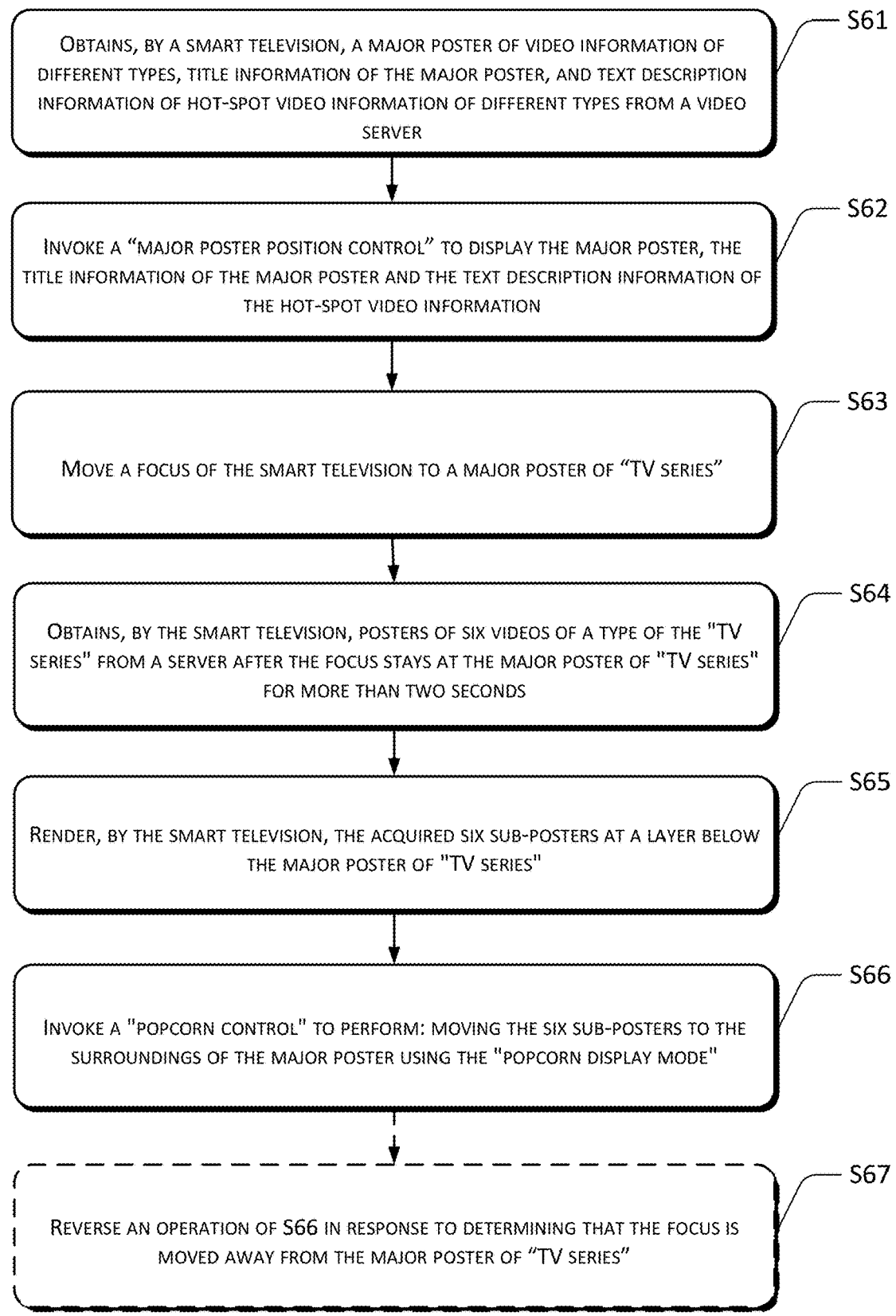
FIG. 6A is a flowchart illustrating a method used by a smart television to display a sub-poster through a popcorn display mode in accordance with a second embodiment of the present disclosure.

The second embodiment provides a method of a smart television to display a sub-poster using the popcorn display mode. A flowchart of an exemplary implementation of the method is shown in FIG. 6A, and includes:

At block S61, a smart television obtains a major poster of video information of different types, title information of the major poster, and text description information of hot-spot video information of different types from a video server in response to receiving an instruction for starting a video playback application from a user through operation(s) of a remote controller.

The acquired major poster is formed by a background image and a foreground layer element.

Figure 6B:
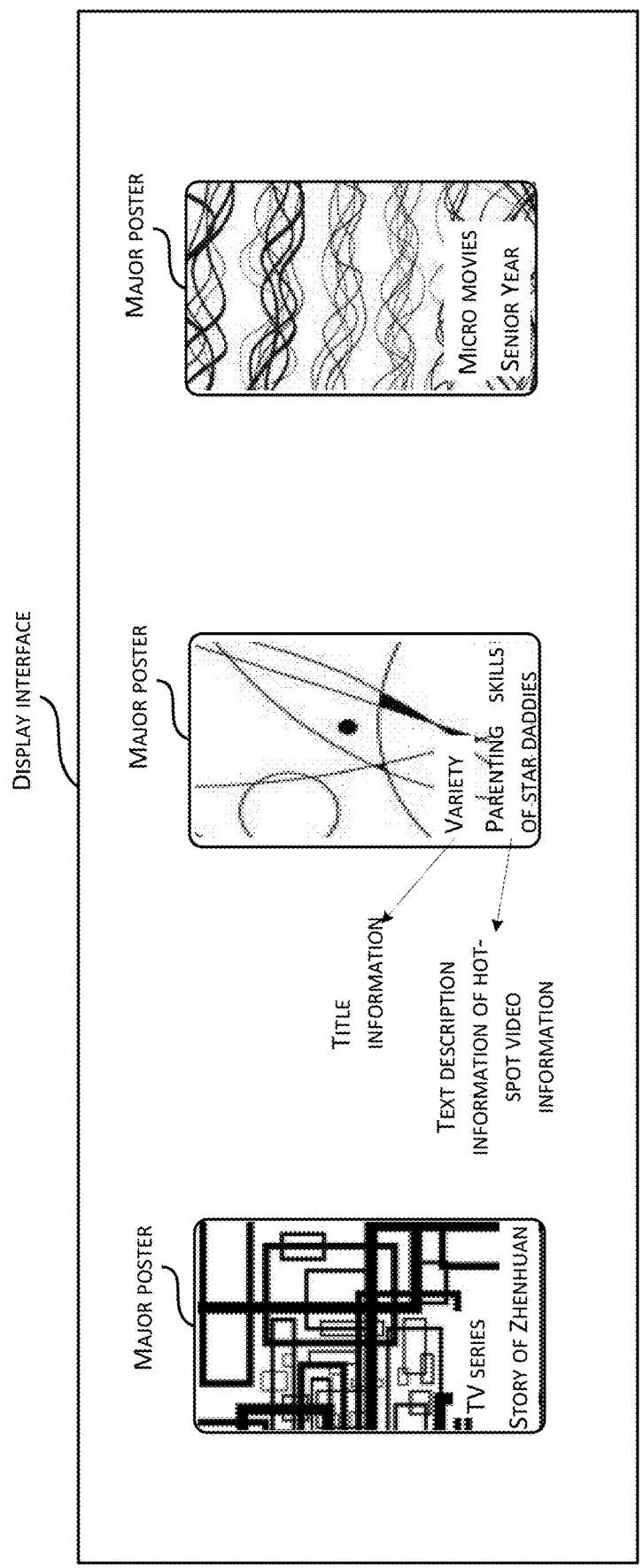
FIG. 6B is a schematic diagram of displaying title information of a major poster and text description information of hot-spot video information in a major poster in accordance with the second embodiment of the present disclosure.

At block S62, the smart television invokes a "major poster position control" to perform: displaying the major poster of video information of different types based on major poster animation parameters (which include an animation effect parameter of a background image and an animation effect parameter of a foreground layer element), displaying title information on the major poster based on the animation effect parameter of the title information as shown in FIG. 6B, and displaying text description information of hot-spot video information on the major poster based on an animation effect parameter of the text description information as shown in FIG. 6B.

The major position control may be a ViewGroup control type that is based on a cloud OS system.

Figure 6C:
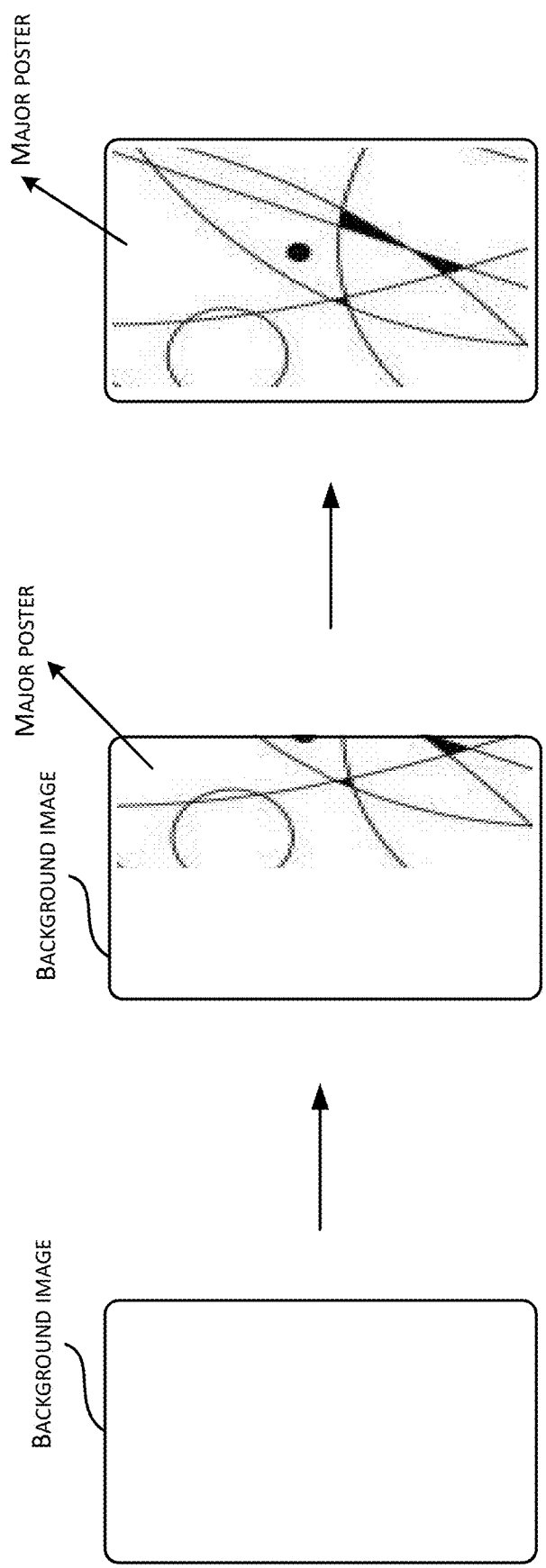
FIG. 6C is a schematic diagram of an animation effect of a foreground layer element in accordance with the second embodiment of the present disclosure.

In the second embodiment, the animation effect of the foreground layer element may include: sliding the foreground layer element into the background image from right to left, as shown in FIG. 6C. Among the three pictures as shown in FIG. 6C, the three pictures arranged from left to right represent that the foreground layer element does not slide into the background image, the foreground layer element partially slides into the background image, and the foreground layer element completely slides into the background image respectively.

The animation effect of the background image may include enlarging and translating an element in the background image.

The animation effect of the text description information of the hot-spot video information may include displaying the text description information of the hot-spot video information in a rolling manner.

The animation effect of the title information may include sliding into the background image from right to left.

An implementation of the animation effect of the foreground layer element is used as an example. Based on a time parameter of sliding into the background image, a displacement parameter and a transparency parameter included in an animation effect parameter of the foreground layer element, the major poster position control may determine a time at which the foreground layer element slides into the background image, a translation distance in the background image and a degree of transparency, and display the foreground layer element according to the determined information.

Similarly, the major poster position control may display the title information on the major poster according to an animation effect parameter of the title information, and display the text description information of the hot-spot video information on the major poster according to an animation effect parameter of the text description information, which are not redundantly described herein.

At block S63, the user operates the remote controller to move a targeting focus (generally referred to as a focus) of the smart television to a major poster of "TV series".

At block S64, the smart television obtains posters of six videos of a type of the "TV series" from a server, i.e., acquires six sub-posters, in response to determining that the targeting focus stays at the major poster of "TV series" for more than two seconds.

At block S65, the smart television renders the acquired six sub-posters at a layer below the major poster of "TV series", so that the six sub-posters are invisible for the user.

At block S66, the smart television invokes a "popcorn control" to perform: moving the six sub-posters rendered at the layer below the major poster of "TV series" to the surroundings of the major poster using the "popcorn display mode". Moreover, the smart television invokes a "personal information control" to perform: setting up an information portal displaying "viewing record" and an information portal displaying "my favorite" in the smart television.

Both the popcorn control and the personal information control may be of a ViewGroup control type that is based on a cloud OS system.

Specifically, the popcorn control may first display the six sub-posters and move to respective transient positions according to a transient position parameter, an animation time length parameter, a transparency parameter and a delayed display time length parameter. The sub-posters that are moved to the respective transient positions may then be moved further according to a final position parameter to respective final positions for display.

In the second embodiment, the information portal of "viewing record" and the information portal of "my favorites" may both be called as information portals of "user personal information" as described above.

The user may conveniently control the smart television to display information of videos that have been viewed by the user via the displayed information portal of "viewing record". The user may conveniently control the smart television to display information of videos that are collected by the user via the information portal of "my favorites".

Figure 6D:
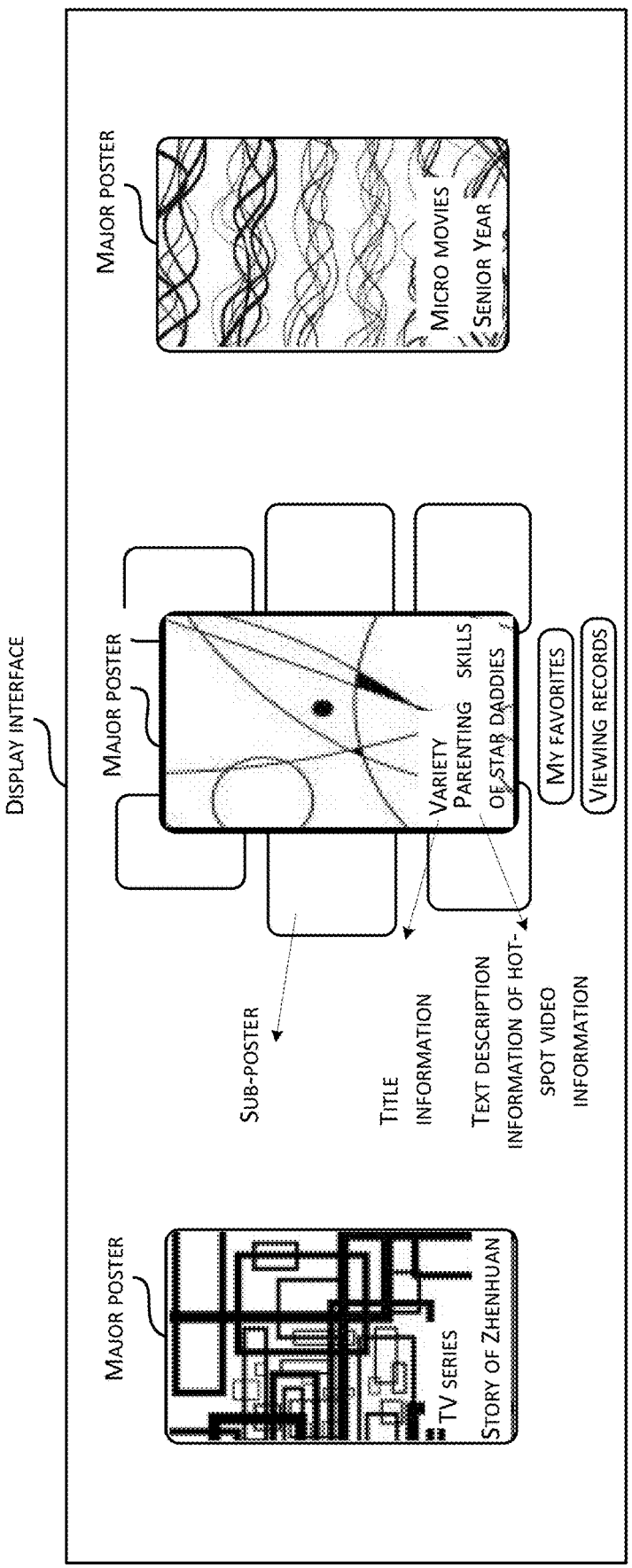
FIG. 6D is a schematic diagram of displaying a major poster, sub-posters, an information portal of "user personal information", title information of the major poster and text description information of hot-spot video information by a smart television.

Major posters shown in FIG. 6B are used as an example. If the user selects a major poster at the center of the display interface, information displayed by the smart television may be represented by FIG. 6D after performing block S66. In FIG. 6D, six rounded rectangular blocks (for sake of clarity, content in the 6 rounded rectangular blocks is omitted in FIG. 6D) are just sub-posters shown by the smart television in the "popcorn display mode". Below the major poster surrounded by these sub-posters are an information portal of "viewing record" and an information portal of "my favorites" that are displayed by the smart television.

At this point, the smart television completes the display of the major poster, the sub-posters, the information portal of "user personal information", the title information, and the text description information of the hot-spot video information. A region where the major poster, the title information, and the text description information of the hot-spot video information are located may be referred to as a "major poster region", a region where the sub-posters are located may be referred to as a "popcorn region", and a region where the information portal of "user personal information" is located may be referred to as a personal information region.

At block S67, the smart television performs an operation that is opposite to block S66 when the user operates the remote controller to move the focus away from the major poster of "TV series", such that the six sub-posters are moved back to the layer below the major poster of "TV series".

The method provided in the second embodiment enables a user to view an information set presented in a relatively elegant display mode and improves the user experience while reducing the complexity of a process of displaying the information set and improving the efficiency of the process.

Third Embodiment

Figure 7:
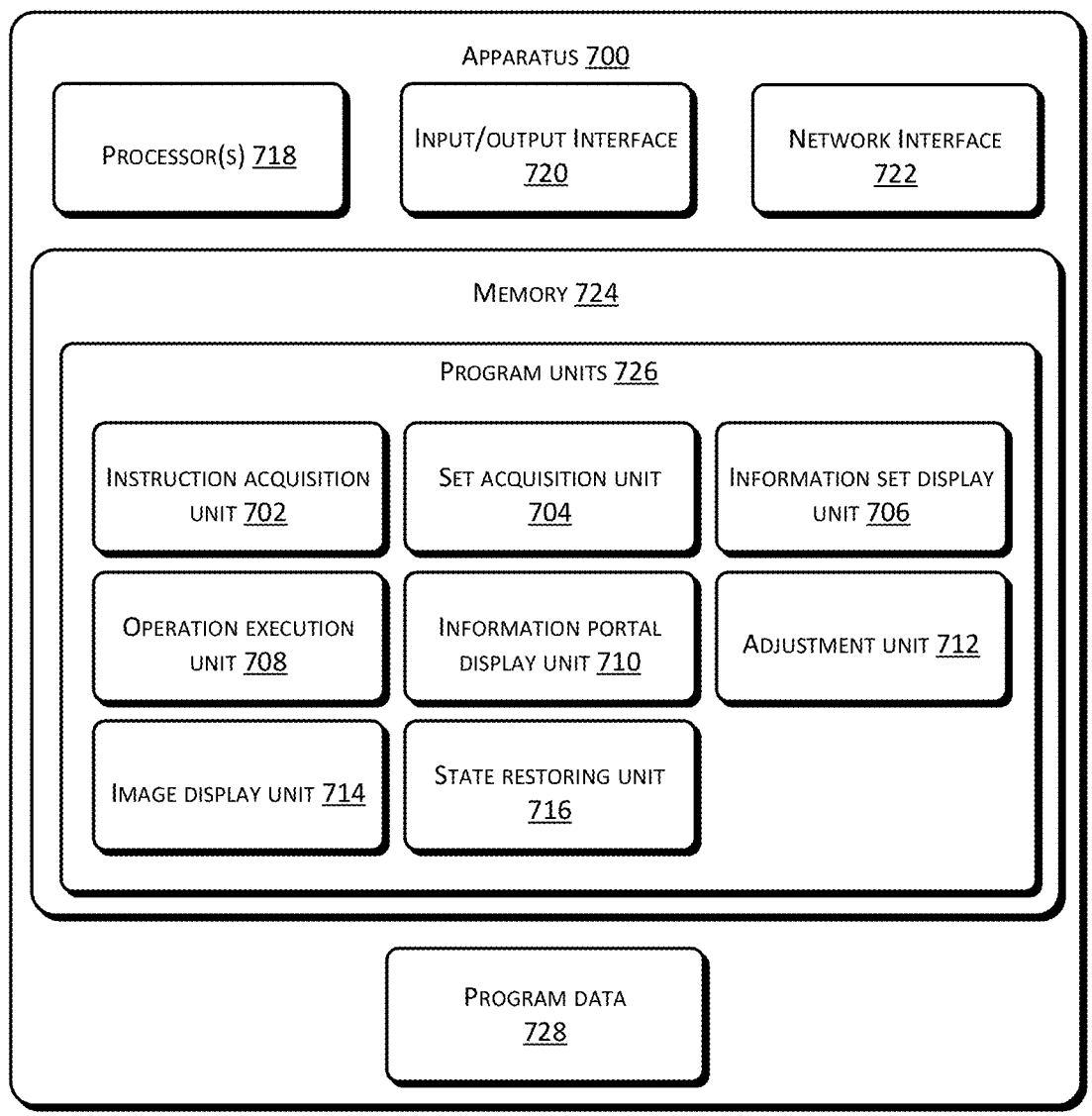
FIG. 7 is a schematic structural diagram of an information display apparatus in accordance with a third embodiment of the present disclosure.

The third embodiment provides an information display apparatus to solve the problem of tediousness and inefficiency of the process of displaying an information set corresponding to an information portal in existing technologies. A schematic diagram of an example structure of the apparatus 700 is as shown in FIG. 7, which includes an instruction acquisition unit 702, a set acquisition unit 704, and an information set display unit 706. A description of these functional units is given as follows:

The instruction acquisition unit 702 is configured to acquire a selection instruction for an information portal.

The set acquisition unit 704 is configured to acquire an information set corresponding to the information portal for which the selection instruction is acquired by the instruction acquisition unit 702.

The information set display unit 706 is configured to display the information set acquired by the set acquisition unit 704.

Optionally, the set acquisition unit 704 may acquire the information set from a server or acquire the information set locally.

If the set acquisition unit 704 acquires the information set from the server, this unit may send an information acquisition request including an identification of the information portal to the server, thereby acquiring the information set that matches with the identification of the information portal from the server based on the identification of the information portal.

Optionally, the information set that matches with the identification of the information portal may include: piece(s) of information selected from information matched with the identification of the information portal according to an information heat rate.

In order to improve and allow the user to view user personal information conveniently, the information set display unit 706 may further display an information portal of the user personal information when displaying the information set acquired by the set acquisition unit 704.

The user personal information may include: browsing history information of information by the user, recommended information according to past operations on the information by the user or information collected by the user, etc.

Optionally, in order to enable the user to acquire recently popular information, the information set display unit 706 may further configured to display hot-spot information that matches with the information portal when displaying the information set acquired by the set acquisition unit 704.

Optionally, the information set display unit 706 may further display other information or an application portal matching with the information portal when displaying the information set acquired by the set acquisition unit 704.

Optionally, the information set display unit 706 may be configured to display the information set acquired by the set acquisition unit 704 according to a first particular parameter, thereby displaying the information set through a "popcorn display mode". The first particular parameter includes at least a display position parameter, the display position parameter being used to indicate a position of displaying an associated piece of information and the display position parameter satisfying a condition that respective display positions of various pieces of information in the information set acquired by the information set acquisition unit 704 are distributed radially or quasi-radially with the center thereof being a position of the information portal.

Optionally, in order for the information set to present a "rebound effect" in the display process, the display position parameter may include a transient position parameter and a final position parameter. When the position parameter includes a transient position parameter and a final position parameter, the information set display unit 706 is configured to display the pieces of information in the information set acquired by the set acquisition unit 704 at respective transient positions according to the transient position parameter, and move the pieces of information in the information set displayed at the respective transient positions to respective final positions for display according to the final position parameter.

Optionally, the first particular parameter may further include at least one of: an animation time length parameter, a transparency parameter and a delayed display time length parameter.

Optionally, the apparatus 700 provided in the third embodiment of the present disclosure may further include an operation execution unit 708, which is configured to execute an operation of reversing an operation of displaying the information set acquired by the set acquisition unit 704 according to the first particular parameter in response to detecting that the information portal is switched from being selected to being unselected after the information set display unit 706 displays the information set.

Optionally, when the information used as the information portal includes a foreground layer element, a background image, title information and hot-spot information, the apparatus 700 provided in the third embodiment of the present disclosure may further include an information portal display unit 710, which is configured to display the information portal according to a second particular parameter before the instruction acquisition unit 702 acquires the selection instruction for the information portal, where the second particular parameter includes an animation effect parameter of the foreground layer element, an animation effect parameter of the background image, an animation effect parameter of the title information and an animation effect parameter of the hot-spot information.

Optionally, when respective pieces of information in both the information portal and the information set are images, the information set display unit 706 may further display an image set via the "image wall display mode". Specifically, the information set display unit 706 may be configured to reduce a current size of an image used as the information portal according to a zoom scale parameter to acquire a reduced image, and display an image wall formed by the reduced image and image(s) included in the information set acquired by the set acquisition unit 704 at the position of the information portal.

Optionally, the information set display unit 706 may display the image wall according to an image wall curvature parameter and/or an image position adjustment parameter.

Optionally, if the image set is displayed via the "image wall display mode", the apparatus 700 provided in the third embodiment of the present disclosure may further include an adjustment unit 712 and an image display unit 714. The adjustment unit 712 is configured to adjust the size of the image used as the information portal according to an adjustment rule that the size of the image used as the information portal is not less than a minimum size threshold and is not larger than a display size of the information portal to acquire an adjusted image before the instruction acquisition unit 702 acquires the selection instruction for the information portal. The image display unit 714 is configured to display the adjusted image acquired by the adjustment unit 712.

Optionally, if the information portal displays information of a first-level category before being selected, the information set corresponding to the information portal includes information of a second-level category under the first-level category, and the information set display unit 706 may be configured to display the information set at an interface corresponding to the information portal.

Optionally, the instruction acquisition unit 702 may further be configured to receive an instruction for selecting a piece of information in the displayed information set after the information set display unit 706 displays the information set at the interface corresponding to the information portal. The information set display unit 706 may further be configured to jump to a page corresponding to the selected piece of information.

Optionally, the apparatus 700 provided in the third embodiment of the present disclosure may further include a state restoring unit 716, which is configured to restore the interface corresponding to the information portal to a state before the information portal is selected after the information set display unit 706 displays the information set, in response to detecting that the information portal is switched from being selected to being unselected. The interface corresponding to the information portal may include an interface having the information portal displayed.

In an embodiment, the apparatus 700 may further include one or more computing devices. For example, the apparatus 700 may include one or more processors (CPUs) 718, an input/output interface 720, a network interface 722 and memory 724.

The memory 724 may include a form of computer readable media such as volatile memory, Random Access Memory (RAM), and/or non-volatile memory, e.g., Read-Only Memory (ROM) or flash RAM, etc. The memory 724 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 724 may include program units 726 and program data 728. The program units 726 may include one or more units as described in the foregoing embodiments. For example, the program units 726 may include one or more of the instruction acquisition unit 702, the set acquisition unit 704, the information set display unit 706, the operation execution unit 708, the information portal display unit 710, the adjustment unit 712, the image display unit 714 and the state restoring unit 716. Details of these units have been described in the foregoing embodiments, and are therefore not repeatedly described herein.

By using the apparatus 700 provided in the third embodiment of the present disclosure, since an information set corresponding to an information portal may be acquired and displayed based on a selection instruction for the information portal, a "confirm" instruction inputted via a control of an instruction input apparatus is not needed as a display triggering condition for the information set, thus reducing the complexity of a process of displaying the information set and improving the efficiency of the process.

One skilled in the art should understand that the embodiments of the present disclosure can be provided as a method, an apparatus (a system) or a product of a computer program. Therefore, the present disclosure can be implemented as an embodiment of only hardware, an embodiment of only software or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The present disclosure is described in accordance with flowcharts and/or block diagrams of the exemplary methods, terminal apparatuses (systems) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing terminal device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing terminal device.

Such computer program instructions may also be stored in a computer readable memory device which may cause a computer or another programmable data processing mobile apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing terminal apparatus, so that a series of operations may be executed by the computer or the other data processing terminal apparatus to generate a computer implemented process. Therefore, the instructions executed by the computer or the other programmable apparatus may be used to implement one or more processes of the flowcharts and/or one or more blocks of the block diagrams.

It should also be noted that terms such as "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include a/an . . . " does not exclude any other similar elements from existing in the process, method, product or apparatus.

One skilled in the art should understand that the embodiments of the present disclosure can be provided as a method, a system or a computer program product. Therefore, the present disclosure can be implemented as an embodiment of only hardware, an embodiment of only software or an embodiment of a combination of hardware and software. Moreover, the present disclosure can be implemented as a computer program product that may be stored in one or more computer readable storage media (which includes but is not limited to, a magnetic disk, a CD-ROM or an optical disk, etc.) that store computer-executable instructions.

The above descriptions are merely exemplary embodiments of the present disclosure, and are not intended to limit the present disclosure. Any modifications, equivalent replacements and improvements, etc., made within the spirit and principle of the present disclosure should be included in the protection scope of the present disclosure.

The invention claimed is:

1. A method implemented by one or more computing devices, the method comprising:
    acquiring, at a computing device, a selection instruction for a displayed information portal;
    retrieving, by the computing device from a remote server, an information set corresponding to the information portal upon the access of the information set;
    rendering, at the computing device, the information set behind the information portal, the rendering causing a plurality of pieces of information in the information set to be completely occluded by the information portal;
    displaying, at the computing device, the information set in response to a control instruction and according to a first particular parameter, wherein the first particular parameter includes a display position parameter indicating a position of displaying the plurality of pieces of information in the information set and wherein the display position parameter satisfies a condition that respective display positions of the plurality of pieces of information are distributed radially or quasi-radially with a center thereof being located at a position of the information portal, wherein the display position parameter further includes a transient position parameter and a final position parameter, the transient position parameter comprising a first display position relative to the information portal and the final position parameter comprising a second display position relative to the transient position parameter, the displaying comprising moving, by the computing device, each of the plurality of pieces of information to a respective display position based on the display position parameter such that each of the plurality of pieces of information are moved away from the center of the information portal and partially occluded by the information portal, are initially displayed at the transient position parameter, and are subsequently moved to the final position parameter; and
    executing, by the computing device after displaying the information set, an operation of reversing the displaying of the information set according to the first particular parameter in response to detecting that the information portal is switched from being selected to being unselected.

2. The method of claim 1, wherein the displaying the information set according to the first particular parameter comprises:
    displaying the plurality of pieces of information in the information set at respective transient positions according to the transient position parameter; and
    moving the plurality of pieces of information in the information set displayed at the respective transient positions to respective final positions for display according to the final position parameter.

3. The method of claim 1, wherein the first particular parameter further comprises at least one of: an animation time length parameter, a transparency parameter and a delayed display time length parameter.

4. The method of claim 1, wherein information used as the information portal includes a foreground layer element, a background image, title information, and hot-spot information, and wherein prior to acquiring the selection instruction for the information portal, the method further comprises displaying the information portal according to a second particular parameter, the second particular parameter comprising an animation effect parameter of the foreground layer element, an animation effect parameter of the background image, an animation effect parameter of the title information and an animation effect parameter of the hot-spot information.

5. The method of claim 4, wherein:
the animation effect parameter of the foreground layer element comprises a time parameter of sliding into the background image, a displacement parameter, a transparency parameter or a zoom range parameter;
the animation effect parameter of the background image, the animation effect parameter of the title information and the animation effect parameter of the hot-spot information each comprise a respective displacement parameter, a respective transparency parameter or a respective zoom range parameter.

6. The method of claim 1, wherein respective pieces of information in the information portal and the information set comprise images, and wherein displaying the information set comprises:
reducing a current size of an image that is used as the information portal according to a zoom scale parameter to acquire a reduced image; and
displaying an image wall formed by the reduced image and one or more images included in the information set at a position of the information portal.

7. The method of claim 6, wherein prior to acquiring the selection instruction for the information portal, the method further comprises:
adjusting the current size of the image that is used as the information portal according to an adjustment rule that the current size of the image used as the information portal is not less than a minimum size threshold and is not larger than a display size of the information portal to acquire an adjusted image; and
displaying the adjusted image.

8. The method of claim 1, further comprising:
receiving a new instruction for selecting a piece of information in the displayed information set; and
jumping to a page corresponding to the selected piece of information.

9. The method of claim 1, further comprising:
detecting that the information portal is switched from being selected to being unselected after displaying the information set; and
restoring an interface corresponding to the information portal to a state before the information portal is selected.

10. An apparatus comprising:
one or more processors;
memory;
an instruction acquisition unit stored in the memory and executable by the one or more processors to acquire a selection instruction for a displayed information portal;
a set acquisition unit stored in the memory and executable by the one or more processors to retrieve, from a remote server, an information set corresponding to the information portal for which the selection instruction is acquired by the instruction acquisition unit upon the access of the information set;
an information set display unit stored in the memory and executable by the one or more processors to render the information set behind the information portal, the rendering causing a plurality of pieces of information in the information set to be completely occluded by the information portal, and display the information set in response to a control instruction and acquired by the set acquisition unit according to a first particular parameter, wherein the first particular parameter includes a display position parameter indicating a position of displaying in response to a control instruction and wherein the display position parameter satisfies a condition that respective display positions of the plurality of pieces of information are distributed radially or quasi-radially with a center thereof being located at a position of the information portal, the displaying comprising moving, by the computing device, each of the plurality of pieces of information from the information portal to a respective display position based on the display position parameter such that each of the plurality of pieces of information are partially occluded by the information portal; and
an operation execution unit to execute an operation that reverses the displaying of the information set according to the first particular parameter in response to detecting that the information portal is switched from being selected to being unselected, after the information set display unit displays the information set.

11. The apparatus of claim 10, wherein the information set display unit displays the information set according to a first particular parameter including a transient position parameter and a final position parameter, and wherein the information set display unit is further configured to display a plurality of pieces of information in the information set at respective transient positions according to the transient position parameter; and move the plurality of pieces of information in the information set displayed at the respective transient positions to respective final positions for display according to the final position parameter.

12. One or more computer-readable media storing executable instructions that, when executed by one or more processors, cause the one or more processors to perform acts comprising:
acquiring a selection instruction for a displayed information portal
retrieving, from a remote server, an information set corresponding to the information portal upon the access of the information set;
rendering the information set behind the information portal, the rendering causing a plurality of pieces of information in the information set to be completely occluded by the information portal;
displaying the information set in response to a control instruction and according to a first particular parameter, wherein the first particular parameter includes a display position parameter indicating a position of displaying the plurality of pieces of information in the information set and wherein the display position parameter satisfies a condition that respective display positions of the plurality of pieces of information in the information set are distributed radially or quasi-radially with a center thereof being located at a position of the information portal, the displaying comprising moving, by the computing device, each of the plurality of pieces of information from the information portal to a respective display position based on the display position parameter such that each of the plurality of pieces of information are partially occluded by the information portal; and
executing, after displaying the information set, an operation of reversing the displaying of the information set according to the first particular parameter in response to detecting that the information portal is switched from being selected to being unselected.

13. The one or more computer-readable media of claim 12, wherein the display position parameter comprises a transient position parameter and a final position parameter, and displaying the information set according to the first particular parameter comprises:
  displaying the plurality of pieces of information in the information set at respective transient positions according to the transient position parameter; and
  moving the plurality of pieces of information in the information set displayed at the respective transient positions to respective final positions for display according to the final position parameter.

14. The one or more computer-readable media of claim 12, wherein respective pieces of information in the information portal and the information set comprise images, and wherein displaying the information set comprises:
  reducing a current size of an image that is used as the information portal according to a zoom scale parameter to acquire a reduced image; and
  displaying an image wall formed by the reduced image and one or more images included in the information set at a position of the information portal.

* * * * *